United States Patent [19]

Klausnitzer et al.

[11] Patent Number: 4,649,742
[45] Date of Patent: Mar. 17, 1987

[54] AUTOMATIC GEAR-SHIFTING ARRANGEMENT

[75] Inventors: Herbert Klausnitzer, Inning; Wolfgang Berndt, Schliersee; Josef Luber, Erding, all of Fed. Rep. of Germany

[73] Assignee: Bayerische Motoren Werke Aktiengesellschaft, Fed. Rep. of Germany

[21] Appl. No.: 791,512

[22] Filed: Oct. 25, 1985

[30] Foreign Application Priority Data

Oct. 27, 1984 [DE] Fed. Rep. of Germany ....... 3439376

[51] Int. Cl.⁴ .......................................... G01M 15/00
[52] U.S. Cl. .................................................. 73/117
[58] Field of Search ............... 73/117, 118; 74/473 P, 74/473 SW

[56] References Cited

U.S. PATENT DOCUMENTS

| | | | |
|---|---|---|---|
| 3,712,126 | 1/1973 | Campbell | 73/117 |
| 3,713,332 | 1/1973 | Herrbrich | 73/117 |
| 4,442,708 | 4/1984 | Gable et al. | 73/117 |
| 4,466,279 | 8/1984 | Gable et al. | 73/117 |
| 4,495,801 | 1/1985 | Sugimoto | 73/117 |

*Primary Examiner*—Myracle Jerry W.
*Assistant Examiner*—Robert R. Raevis
*Attorney, Agent, or Firm*—Barnes & Thornburg

[57] ABSTRACT

In an automatic gear-shifting mechanism for a shiftable transmission of motor vehicles, with two adjusting mechanisms which are each vertically pivotal about a vertical bearing and which displace a shifting lever of the gear-shifting transmission into the gear positions according to a test program, two freely movable horizontal bearings for the horizontal movement of the shifting lever are coordinated to the adjusting mechanisms and the adjusting mechanisms are constructed as electric stepping motors. The testing program is obtained with the use of the respective gear-shifting transmission.

18 Claims, 8 Drawing Figures

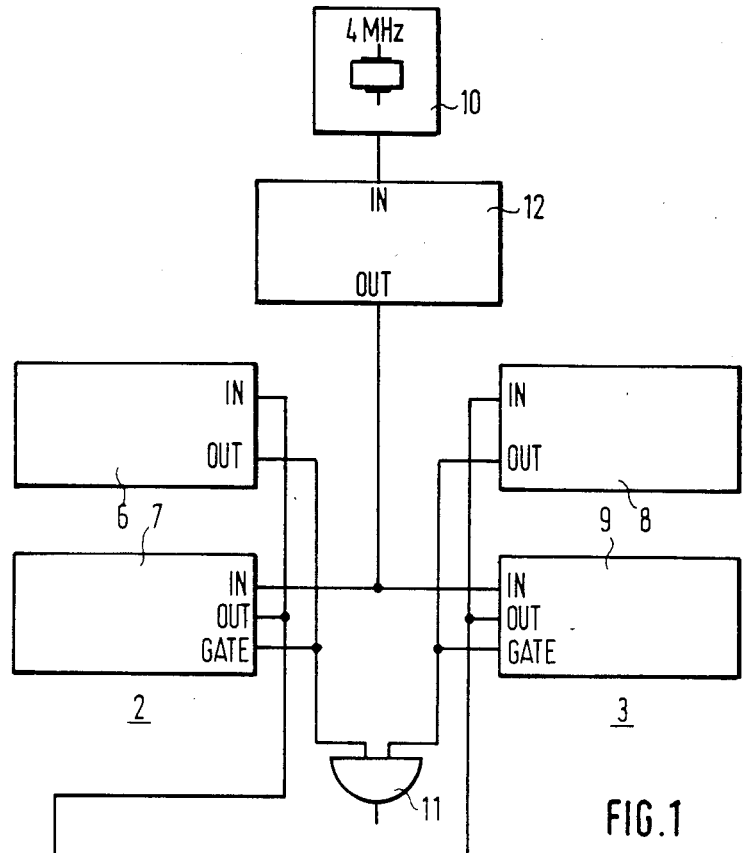
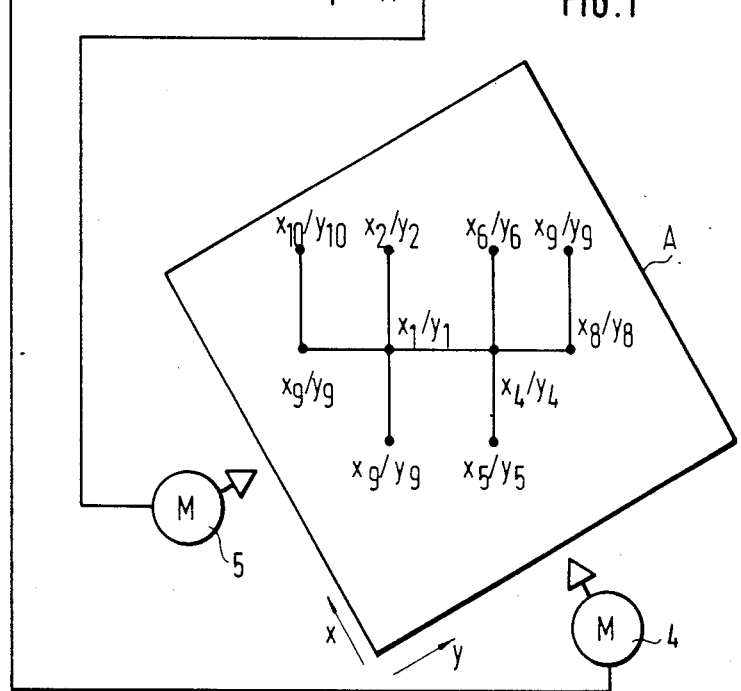
FIG.1

AUTOMATIC GEAR-SHIFTING ARRANGEMENT

The present invention relates to an automatic gear-shifting arrangement for a manually shifted transmission of motor vehicles, with two adjusting mechanisms which are each pivotal vertically about a vertical bearing and displace a shifting lever of the transmission into the gear positions according to a testing program.

In such an automatic gear-shifting arrangement as is disclosed in the DE-OS No. 20 04 979, pneumatic adjusting mechanisms in the form of operating cylinders are used which are movably supported exclusively horizontally on a base plate. The two working cylinders are disposed mutually perpendicularly and are aligned to the main directions of the transmission. The effective length of the working cylinder is relatively large in order to thereby avoid far-reaching movements transversely to the respectively operating direction. In addition to pneumatic adjusting mechanisms, the possible use of electric adjusting mechanisms is also generally mentioned but without any concrete indications.

The prior art automatic shifting arrangement entails various disadvantages. Thus, it requires quite a large amount of space and has to be aligned accurately to the change-speed transmission. This is achieved by installation in lieu of a front seat of the motor vehicle. Owing to the absent transverse movability of the adjusting mechanisms, the operating field is strongly constricted. This movability could be improved by elastic bearing supports of the working cylinders. This, however, would have considerable effects on the length of life because especially with larger cross movements, a considerable load of such bearings with a high rate of wear must be reckoned with. Also, these prior art adjusting mechanisms involve servo systems which require a high control expenditure.

The present invention is concerned with the task to provide an automatic gear-shifting mechanism of the aforementioned type which can be utilized universally and which also is subjected to at most slight wear.

The underlying problems are solved according to the present invention in that two freely movable horizontal bearings for the horizontal movement of the shifting lever are coordinated to the adjusting mechanisms, in that the adjusting mechanisms are electric stepping motors and in that the testing program is obtained with the use of the respective change-speed transmission.

The required structural space is reduced by the horizontal bearings because the adjusting mechanisms can be arranged relatively close to the shifting lever. The horizontal taking along of the one adjusting mechanism by reason of the movement of the other adjusting mechanism which can become larger with a reduction of this distance, can be absorbed by the horizontal bearings. The use of stepping motors makes it possible to dispense with expensive servo-systems. The combination of horizontal joints together with the stepping motors additionally permits to shift any manual or automatic change-speed transmissions having also relatively large operating fields rapidly and reliably within a small space. As a result thereof, the required testing period is considerably reduced. The free programming ability of the test program also offers the possibility to shift different gear-shifting transmissions one after the other. The need is thereby dispensed with to align the adjusting mechanisms to the shifting lever. The free programmability also makes it possible to test change-speed transmissions of the same type, one after the other, without having to undertake the adjustment of the adjusting mechanisms each in the same manner. On the other hand, insofar as the exact alignment of the adjusting mechanisms for successive transmissions of the same type is assured in one and the same manner, each transmission can be tested with the assistance of the test program determined with the first transmission.

Each test program can be carried out in a different manner. Thus, it is possible to select the control frequencies of the stepping motors independently of one another and, for example, to displace the adjusting mechanisms one after the other. In contrast thereto, a reduction of the required time is obtained if the adjusting mechanisms are controlled simultaneously. The matching of the control frequencies of the two stepping motors can thereby take place in such a manner that both control frequencies are derived from a common main frequency. The possibility exists thereby to carry out the test programs with an adjustable speed. The change of the main frequency is then only necessary for that purpose.

Misadjustments may occur during the operation of the automatic gear-shifting mechanism. One of the causes may be a step loss of a stepping motor. The individual speeds can therefore no longer be started accurately. Such a case can be recognized with the aid of bending stress gauge at the shifting lever, by means of which the movement thereof can be controlled and possibly remedial measures can be initiated. The transducer recognizes when the shifting lever can no longer be displaced into a lane, respectively, if the shifting position is not reached in these lanes. In the former case, the bending stress is larger, in the second case, smaller than with correct operation.

The constructive realization of the automatic gear-shifting mechanism can take place in different ways. Thus, for example, a toothed rack and a horizontal bearing may be arranged in the transmission path between at least one of the stepping motors and the shifting lever. This toothed rack can thereby be movable vertically either together with the associated stepping motor or also alone or may also not be movable in the vertical direction. In this case, the vertical movement can additionally take place by way of the horizontal bearing insofar as the latter is constructed as ball joint. A rigid rod may then be arranged between the shifting lever which is also secured at the shifting lever with the aid of a ball joint. A further possibility to realize the horizontal bearing consists in axially movably supporting the toothed rack and pivotally supporting the same about the axis of at least one of the stepping motors. Various embodiments exist therefor. In one realization, the toothed rack is freely rotatable about the axis of the stepping motor. In a further embodiment, the pivot movement of the toothed rack can be controlled by one of the two stepping motors. This opens up a structural simplification insofar as the movement of the shifting lever can then take place by means of a single toothed rack. The toothed rack is adjusted in its effective length by the one stepping motor with respect to the latter and is pivoted about the axis of the first stepping motor by the other stepping motor. The toothed rack thus carries out a combined axial and radial movement.

For this motorized pivot movement of the toothed rack, the latter can be axially movably supported in a circular segment which is rotatably supported about the axis of the first stepping motor. The circular segment itself is thereby driven by the second stepping motor.

These and other objects, features and advantages of the present invention will become more apparent from the following description when taken in connection with the accompanying drawing which shows, for purposes of illustration only, several embodiments in accordance with the present invention, and wherein:

FIG. 1 is a block diagram for the control of the two stepping motors of the automatic gear-shifting mechanism in accordance with the present invention;

Figure 2:
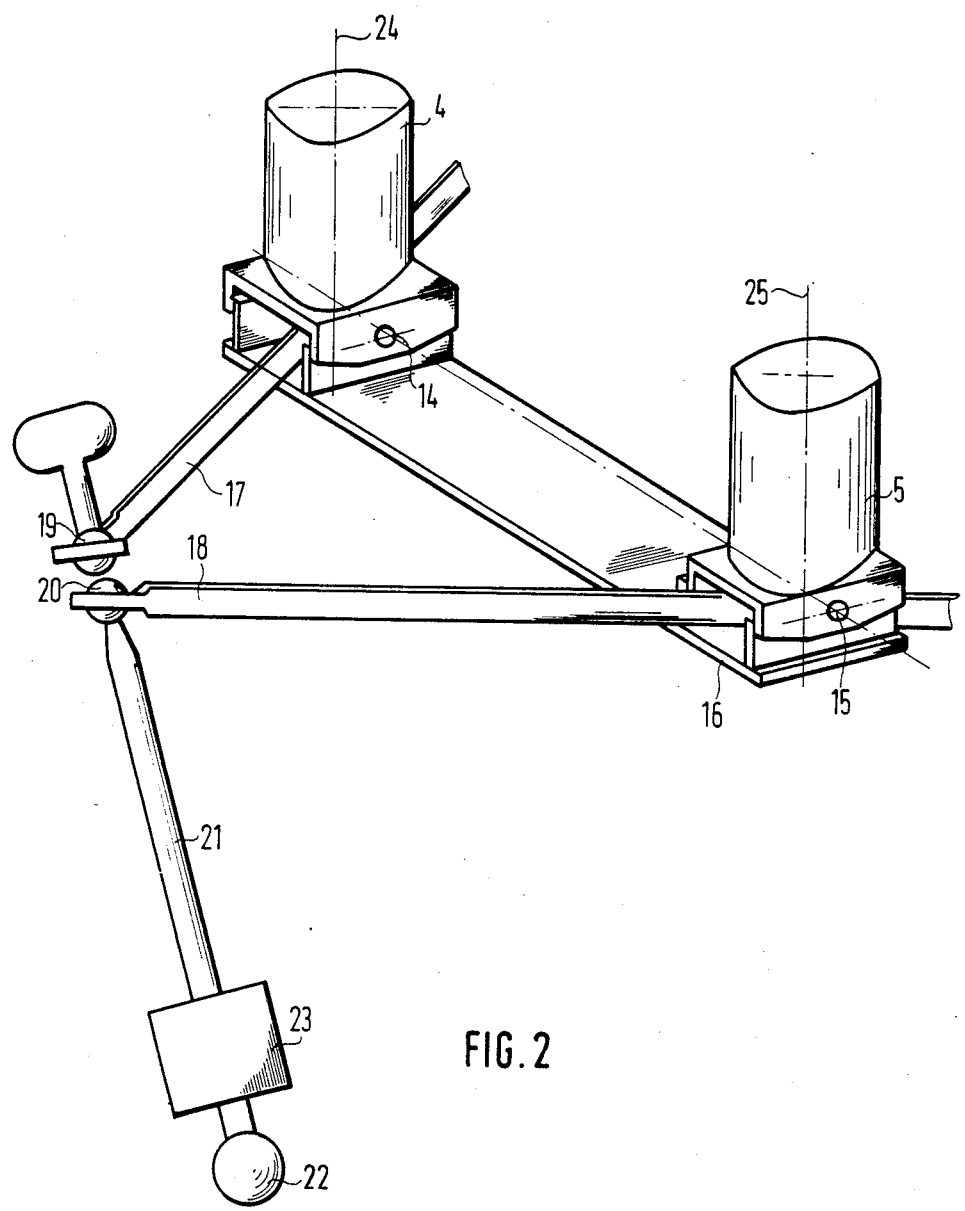
FIG. 2 is a schematic perspective view of a first embodiment of an automatic gear-shifting mechanism in accordance with the present invention.

Referring now to the drawing wherein like reference numerals are used throughout the various views to designate like parts, the block diagram of FIG. 1 includes a memory (not shown) in which are stored the coordinates of a manually shiftable transmission (not shown) to be tested. These coordinates involve the starting and end points of the shifting paths of the manually shifted transmission. With a five speed transmission, it involves thereby eight points for the forward speeds whose coordinates $X_1/Y_1$ to $X_8/Y_8$ are schematically illustrated inside of the operating field A determined by the X- and Y- axis. The coordinate pairs $X_1/Y_1$ to $X_8/Y_8$ are obtained prior to the start of a testing operation with the use of the respective sample to be tested in a manner known, for example, from robot technology, for example, by the so-called teach-in-method. The shifting paths are thereby determined one after the other in that they are traversed manually with the aid of the shifting lever in the X- and Y- direction and are plotted with the aid of angle indicators for the output shaft of the stepping motor 4, respectively, 5.

During the testing operation, the same shifting paths are traversed. For that purpose, the block diagram of FIG. 1 includes essentially two frequency dividers 2 and 3 by means of which the stepping motors 4 and 5 are controlled which are used for the movement of the shifting lever in the X- and Y-direction. The frequency dividers 2 and 3 contain each two counters 6 and 7, respectively, 8 and 9, of which the counters 6 and 8 are set prior to traversing each shifting path to a value that is equal to the difference of the coordinate values in the X-, respectively, Y- directions of the shifting points determining the shifting path. For the first shifting path, in which the shifting lever is moved from the neutral position $(X_1/Y_1)$ into the position $(X_2/Y_2)$ of the first speed, the counter 6 is loaded with the difference $X_2-X_1$ and the counter 8 with the difference $Y_2-Y_1$.

Counters 7 and 9, respectively, are connected ahead of the counters 6 and 8, whose counter condition has the reciprocal value to that of the coordinated counter 6, and 8 respectively This is achieved by constructing the counters 6 and 8 as toggles utilizing known circuit techniques. The inputs "In" of the counters 7 and 9 are connected with an oscillator which produces a main frequency of, for example, 4 MHz. The outputs "Out" are connected, on the one hand, with the stepping motors 4 and 5 and, on the other, with the inputs "In" of the counters 6 and 8. The outputs "Out" of the counters 6 and 8 are connected, on the one hand, with an AND-gate 11 and, on the other, with the gate input of the counters 7 and 9. A counter 12, which acts as a variable frequency divider, is in the connection of the oscillator 10 to the counters 7 and 9; the counter 12 is controlled by a bending stress gauge or pick-up (23, FIG. 2) and the output frequency of the oscillator 10 is changed by counter 12 in such a manner that the movement of the shifting lever 21 (FIG. 2) along a shifting path takes place with constant shifting force. The counter 12 controls the velocity at which the shifting lever is displaced.

The frequency dividers 2 and 3 produce a stepping frequency which is derived from the output frequency of the counter 12.

The output frequency of counter 12 is selected to be larger than the largest coordinate difference to be traversed by the associated stepping motor 4, 5. With the first shifting path, this is the coordinate difference $X_2-X_1$ for the stepping motor 4 and $Y_2-Y_1$ for the stepping motor 5. The shifting lever thus traverses the respective shifting path between its starting and end point. Reaching the end point is determined with the aid of the AND-gate 11 and the passing of the adjoining shifting path is initiated therewith. For that purpose, the counters 6 and 8 are loaded with the corresponding values of the coordinate differences of the shifting path. All of the counters have the value zero prior to this loading. This results for the counters 6 and 8 directly when reaching the end point of the respective shifting path and for the counters 7 and 9 by the input of the AND-gate resulting therefrom with this value. The now-following shifting path is traversed in a corresponding manner. The first shifting path described in detail thereby involves the traversal of the corresponding shifting path, i.e., the traversal of the distance between the point $X_2/Y_2$ and the point $X_1/Y_1$. The next shifting path adjoins the end of this shifting path. It thereby involves the shifting path $X_1/Y_1$ to $X_3/Y_3$ or $X_4/Y_4$.

The embodiment of FIG. 2 illustrates the two stepping motors 4 and 5 which are freely rotatably supported about a horizontal axis 14, and 15 respectively, . The stepping motors are seated on a rigidly secured plate 16. They displace two actuating rods 17 and 18 whose ends are connected in ball joints 19 and 20 one above the other at the shifting lever 21. A bending stress transducer 23 is seated at the base point of the shifting lever 21 which has a point of rotation 22; the bending stress pick-up may be, for example, in the form of strain gauges. The actuating rods 17 and 18 are pivotally supported about the axes 24 and 25 of the stepping motors 4 and 5. It is possible therewith to carry out subsequently the pivot movement, which results necessarily during an axial movement of the one of the actuating rods 17 and 18, of the other actuating rod. The vertical movement of the stepping motors 4 and 5 connected therewith is compensated by the pivot movements about their axes 14 and 15.

Figure 3:
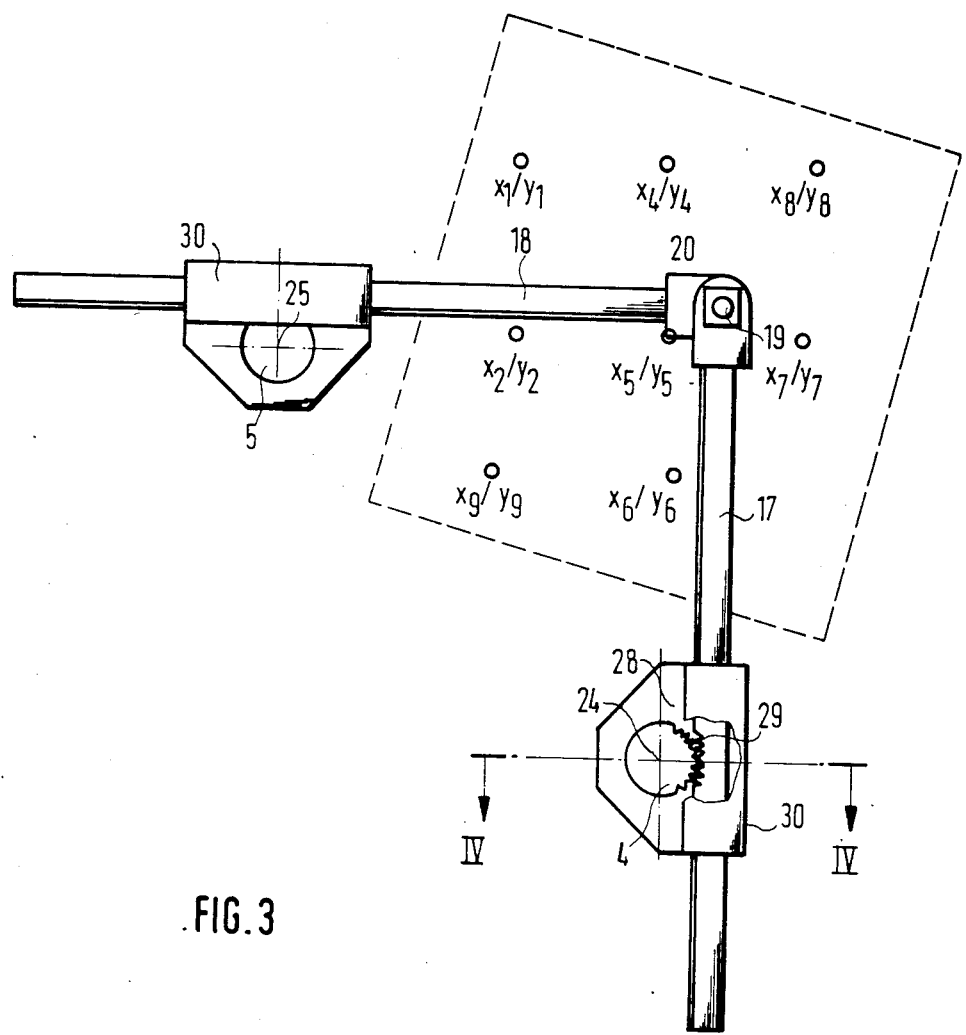
FIG. 3 is a plan view on the automatic gear-shifting mechanism of FIG. 2.
Figure 4:
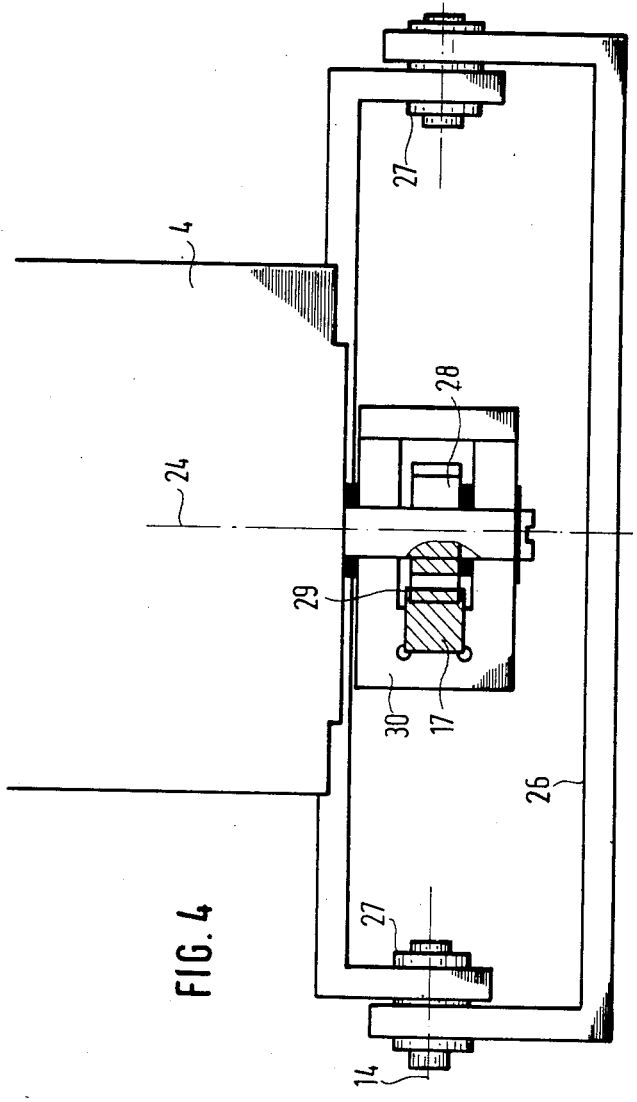
FIG. 4 is a cross-sectional view, taken along line IV—IV of FIG. 3.

The plan view illustrated in FIG. 3, in which the base plate has been omitted, shows the starting position, in which the two actuating rods are disposed perpendicular to one another. Starting therefrom, the shifting paths defined by the indicated points $X_1/Y_1$ to $X_8/Y_8$ are traversed in the described manner. Relatively large pivot movements of the actuating rods 17 and 18 result therefrom which are achieved, respectively, compensated by the joint-like bearing support of these actuating rods with respect to the axes 24 and 25 of the stepping motors 4 and 5. This is explained more fully by reference to FIG. 4. The cross section along line IV—IV in FIG. 3 which is shown in FIG. 4, illustrates the stepping motor 4 which is pivotally supported about the axis 14 in a base member 26. The base member 26 is seated on the base plate 16. A return spring 27 each is provided within the bearing places of the stepping motor 4 in the base member 26, which maintains the stepping motor 4 in upright position. The actuating rod 17 is pivotally supported about the axis 24 which has teeth 29 within the area of a driving pinion 28 of the stepping motor 4. During the axial movement of the actuating rod 17, the latter is moved by the driving pinion 28. With a pivot movement caused by the axial displacement of the actuating rod 18, the bearing member 30 of the actuating rod 17 is pivoted about the axis 24. The driving pinion 28 is thereby so moved that the actuating rod 17 carries out a compensatory axial movement with respect to the driving pinion 28.

Figure 5:
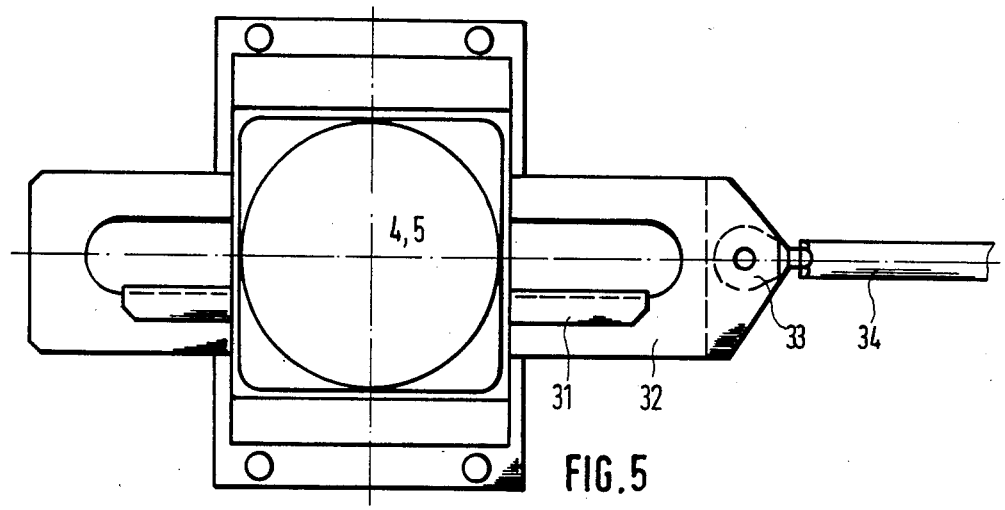
FIG. 5 is a plan view on a second embodiment of an automatic gear-shifting mechanism in accordance with the present invention.
Figure 6:
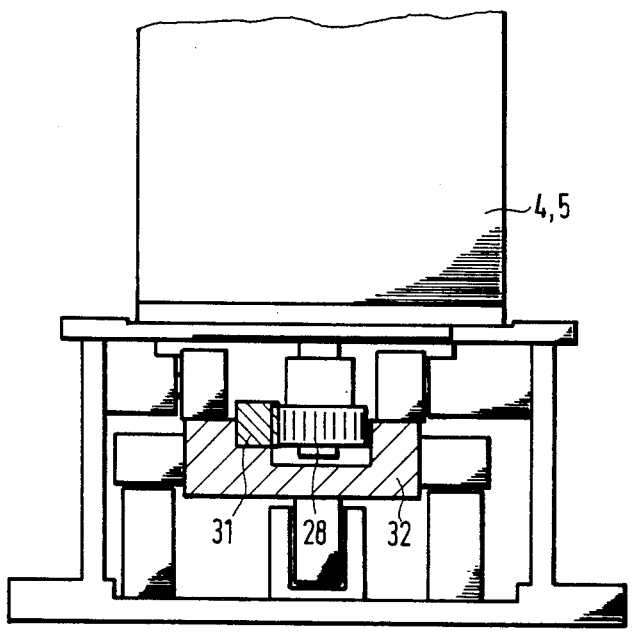
FIG. 6 is a cross-sectional view of FIG. 5.

In the embodiment according to FIGS. 5 and 6, a toothed rack 31 is not pivotally supported with respect to the axis of the stepping motor 4. The toothed rack 31 is seated in a frame 32 which acts on an actuating rod 34 by way of a ball joint 33. The actuating rod 34 is seated at the shifting lever (not shown) in a ball joint that corresponds to the ball joint 19 or 20 of FIG. 2. This embodiment differs in that the toothed rack 31 and the actuating rod 34 do not extend mutually linearly. During an axial movement of the toothed rack 31, forces perpendicular to the axis of the toothed rack 31 result insofar as the actuating rod 34 is not aligned with the toothed rack 31. These forces are compensated by a corresponding dimensioning of the ball joints 33 and of the associated ball joint corresponding to ball joint 19 or 20. Furthermore, the stepping motor 4 is also not pivotal about a horizontal axis. The vertical movement of the ball joints 19 and 20 is compensated when traversing the shifting path by the resulting variable adjustment of the angle of the actuating rod 34.

Figure 7:
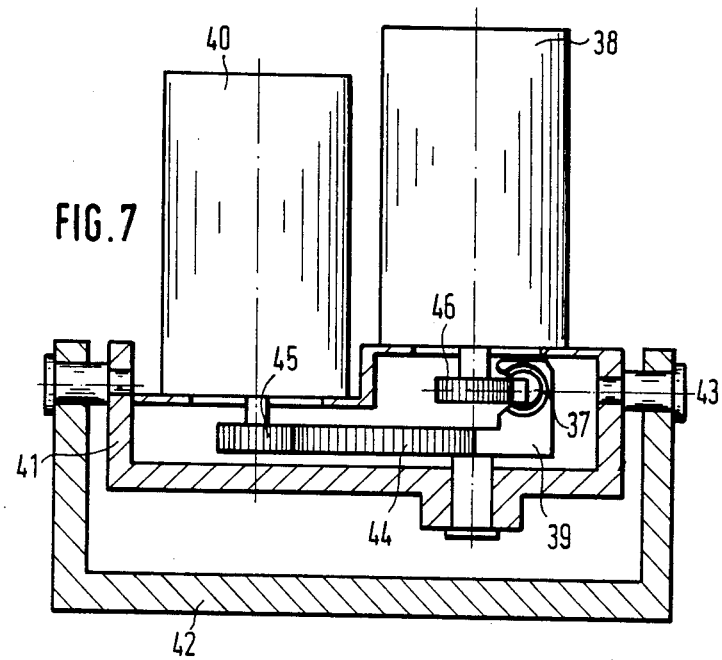
FIG. 7 is a plan view on a third embodiment of an automatic gear-shifting mechanism in accordance with the present invention.
Figure 8:
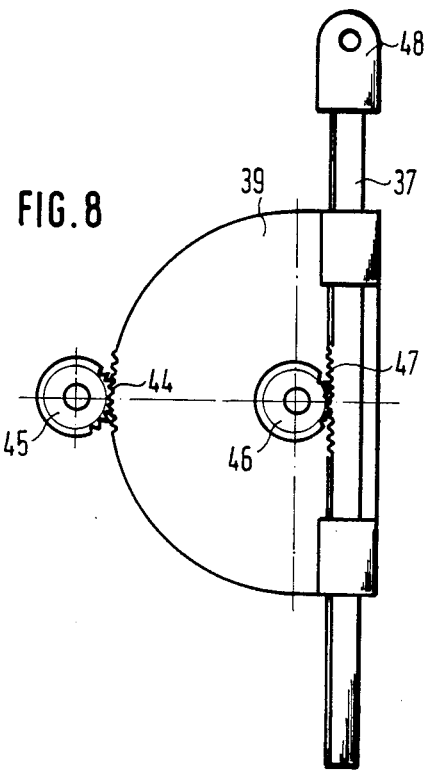
FIG. 8 is a cross-sectional view of FIG. 7.

The embodiment according to FIGS. 7 and 8 differs from the preceding embodiments insofar as the shifting lever 21 is now displaced only by a single actuating rod 37. The actuating rod 37 is displaceably axially with respect to the bearing member 39 by a stepping motor 38. The bearing member 39, on the one hand, is pivotally supported about the axis of the stepping motor 38. A stepping motor 40 is provided for the pivot movement of the bearing member 39 which, together with the stepping motor 38, is secured on an intermediate member 41. The intermediate member, in its turn, is pivotally supported about a horizontal axis 43 in a base member 42 corresponding to the base member 26. The bearing member 39 includes teeth 44 into which engages a drive pinion 45 of the stepping motor 40. The stepping motor 38 engages with its driving pinion 46 into teeth 47 of the toothed rack 37.

The shifting lever is displaced by a corresponding control of the stepping motors 38 and 40 with the aid of the toothed rack 37 which includes at its end a ball joint 48 corresponding to the ball joint 19, respectively, 20. The actuating rod 37 thus carries out a polar movement, whereby the axial adjustment is undertaken by the stepping motor 38 and the angular adjustment of the shifting lever by the stepping motor 40. As in the embodiment according to FIGS. 2 to 4, a vertical movement of the shifting lever resulting thereby is carried out subsequently by pivoting the intermediate member 41 with respect to the base member 42.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An automatic gear-shifting arrangement for a gear-shifting transmission of motor vehicles, comprising:
   two adjusting means each for displacing a shifting lever of the transmission into the gear positions according to a test program;
   each adjusting means includes:
      an actuating rod connected at a first end to said shifting lever and having a second end,
      an electric stepping motor means having an axis of rotation,
      vertical bearing means for vertically pivoting said motor means about a horizontal axis, and
      horizontal bearing means for horizontally pivoting said second end of said actuating rod relative to said motor means about a vertical axis to coordinate the movement of the two adjusting means.

2. An automatic gear-shifting arrangement according to claim 1, further comprising means for deriving the control frequencies of the stepping motor means from a common main frequency.

3. An automatic gear-shifting arrangement according to claim 2, further comprising bending stress transducer means at the shifting lever for the control of the shifting lever's movements.

4. An automatic gear-shifting arrangement according to claim 1, including a toothed rack means connected to said second end of said actuating rod and pivotal about the axis of at least one of the stepping motor means.

5. An automatic gear-shifting arrangement according to claim 4, wherein the toothed rack means is freely rotatable about the axis of the stepping motor means.

6. An automatic gear-shifting arrangement for a gear-shifting transmission of motor vehicles, comprising two adjusting means each vertically pivotal about a horizontal axis of a vertical bearing means and operable to displace a shifting lever of the transmission into the gear positions according to a test program, and two freely movable horizontal bearing means for the horizontal movement of the adjusting means about a vertical axis to coordinate the movement of the adjusting means, the adjusting means including electric stepping motor means, having an axis of rotation
   wherein a toothed rack means is pivotal about the axis of at least one of the stepping motor means and
   wherein the pivot movement of the toothed rack means is controlled by one of the stepping motor means.

7. An automatic gear-shifting arrangement according to claim 6, wherein the toothed rack means is axially movably and supported in a circular segment which is rotatably supported with respect to the axis of one of the stepping motor means.

8. An automatic gear-shifting arrangement for a gear-shifting transmission of motor vehicles, comprising two adjusting means each vertically pivotal about a horizontal axis of a vertical bearing means and operable to displace a shifting lever of the transmission into the gear positions according to a test program, and two freely movable horizontal bearing means for the horizontal movement of the adjusting means about a vertical axis to coordinate the movement of the adjusting means, the adjusting means including electric stepping motor means, having an axis of rotation and
    bending stress transducer means at the shifting lever for the control of the shifting lever's movements.

9. An automatic gear-shifting arrangement for a gear-shifting transmission of motor vehicles, comprising:
    two adjusting means each for displacing a shifting lever of the transmission into the gear positions according to a test program;
    each adjusting means includes:
        an actuating rod connected at a first end to said shifting lever and having a second end,
        an electric stepping motor means having an axis of rotation,
        bearing means for horizontally and vertically rotating said second end of said actuating rod relative to said motor means to coordinate the movement of the two adjusting means.

10. An automatic gear-shifting arrangement according to claim 9, wherein the bearing means includes a ball joint for the additional vertical movement of the shifting lever.

11. An automatic gear-shifting arrangement according to claim 9 including a toothed rack connected to said motor means and said bearing means is mounted between said toothed rack and said second end of said actuating means.

12. An automatic gear-shifting arrangement according to claim 10, wherein the bearing means includes a ball joint for the additional vertical movement of the shifting lever.

13. An automatic gear-shifting arrangement according to claim 9 wherein said bearing means includes a ball joint.

14. An automatic gear-shifting arrangement for a gear-shifting transmission of motor vehicles, comprising:
    first and second electric stepping motor means having an axis of rotation, each motor means being vertically pivotal about a horizontal axis of a vertical bearing means and operable to displace a shifting lever of the transmission into the gear positions according to a test program;
    an actuating rod connected at a first end to said shifting lever and having a second end;
    first gear means connecting said first motor to said second end of said actuating rod for rectilinear movement; and
    second gear means connecting said second motor to said second end of said actuating rod for horizontally pivoting movement about a vertical axis.

15. An automatic gear-shifting arrangement according to claim 14, wherein said first gear means includes a toothed rack means pivotal about the axis of the first stepping motor means.

16. An automatic gear-shifting arrangement according to claim 15, wherein the pivot movement of the toothed rack means is controlled by the second stepping motor means and said second gear means.

17. An automatic gear-shifting arrangaement according to claim 16, wherein the toothed rack means is axially movably supported by said second gear means including a circular segment which is rotatably supported with respect to the axis of the first stepping motor means.

18. An automatic gear-shifting arrangement according to claim 15, wherein the toothed rack means is freely rotatable about the axis of the first stepping motor means.

* * * * *